US008348154B2

(12) United States Patent
Sims et al.

(10) Patent No.: US 8,348,154 B2
(45) Date of Patent: Jan. 8, 2013

(54) METHOD AND DEVICE FOR COMMUNICATION BETWEEN AN AUTOMOBILE AND A POINT OF SALE

(75) Inventors: Michael J. Sims, Zeeland, MI (US); James E. Tralnor, Holland, MI (US); Richard J. Chutorash, Oakland Township, MI (US)

(73) Assignee: Johnson Control Technology Company, Plymouth, MI (US)

( * ) Notice: Subject to any disclaimer, the term of this patent is extended or adjusted under 35 U.S.C. 154(b) by 248 days.

(21) Appl. No.: 12/469,878

(22) Filed: May 21, 2009

(65) Prior Publication Data

US 2009/0289109 A1 Nov. 26, 2009

Related U.S. Application Data

(60) Provisional application No. 61/054,884, filed on May 21, 2008.

(51) Int. Cl.
*G06K 5/00* (2006.01)

(52) U.S. Cl. .......................... 235/380; 235/381; 235/383

(58) Field of Classification Search .................... 705/26; 701/211; 235/380–383
See application file for complete search history.

(56) References Cited

U.S. PATENT DOCUMENTS

| 5,305,435 | A | 4/1994 | Bronson |
| 5,422,473 | A | 6/1995 | Kamata |
| 5,704,051 | A | 12/1997 | Lane et al. |
| 6,240,365 | B1 | 5/2001 | Bunn |
| 6,429,773 | B1 | 8/2002 | Schuyler |
| 6,547,133 | B1 * | 4/2003 | DeVries et al. ............... 235/380 |
| 6,572,015 | B1 | 6/2003 | Norton |
| 6,711,474 | B1 * | 3/2004 | Treyz et al. ....................... 701/1 |
| 6,850,153 | B1 | 2/2005 | Murakami et al. |
| 7,128,274 | B2 | 10/2006 | Kelley et al. |
| 2002/0021228 | A1 | 2/2002 | Amita |
| 2002/0049535 | A1 * | 4/2002 | Rigo et al. ...................... 701/211 |
| 2002/0165789 | A1 * | 11/2002 | Dudek et al. ..................... 705/26 |
| 2003/0043021 | A1 | 3/2003 | Chung |
| 2003/0127513 | A1 | 7/2003 | DeVries et al. |
| 2003/0187787 | A1 * | 10/2003 | Freund ............................ 705/39 |
| 2004/0046751 | A1 | 3/2004 | Heimermann et al. |
| 2004/0127256 | A1 | 7/2004 | Goldthwaite et al. |

(Continued)

FOREIGN PATENT DOCUMENTS

CN 2009/66046 Y 10/2007

(Continued)

OTHER PUBLICATIONS

U.S. Appl. No. 12/532,239, filed Dec. 10, 2009, Lehomme.

(Continued)

*Primary Examiner* — Thien M Le
*Assistant Examiner* — Sonji Johnson
(74) *Attorney, Agent, or Firm* — Dobrusin & Thennisch PC

(57) ABSTRACT

Automobile, Reader and Method facilitating mobile commerce by a user of an automobile is disclosed, the automobile being equipped with a reader to be placed inside of the automobile, the reader being able to read purchasing instrument data of at least one of a contactless credit card or smart card-type credit card or NFC-enabled handset, and the reader being further connected to a wireless communication interface of the automobile, the wireless communication interface being able to transmit the purchasing instrument data to a point of sale.

20 Claims, 2 Drawing Sheets

U.S. PATENT DOCUMENTS

Figure 1:
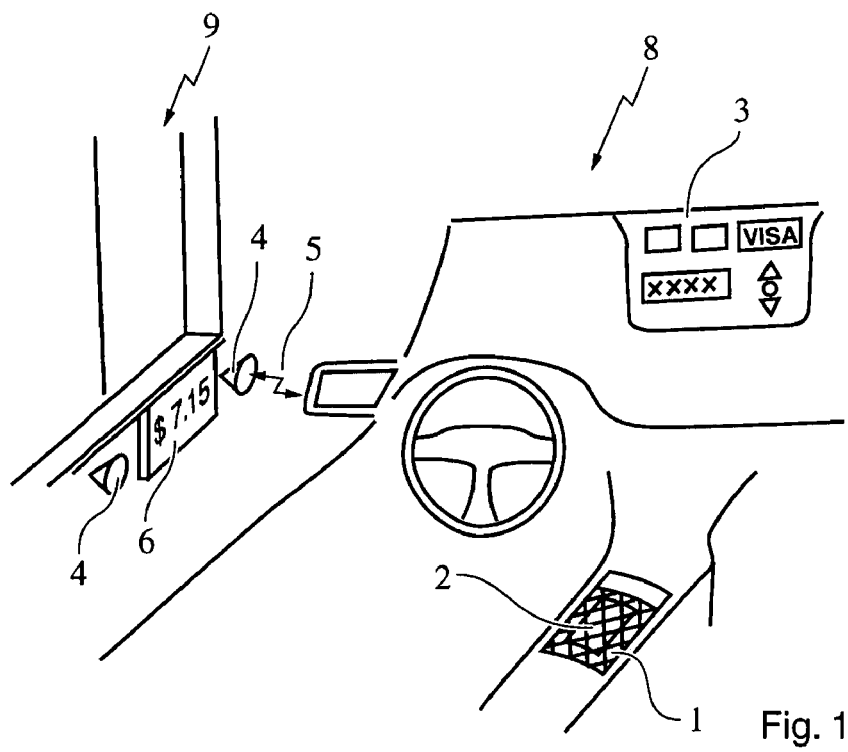

| | | | |
|---|---|---|---|
| 2007/0022472 A1* | 1/2007 | Ritter et al. | 726/7 |
| 2007/0279304 A1 | 12/2007 | Chakam et al. | |
| 2008/0055058 A1 | 3/2008 | Nishiyama | |
| 2008/0064443 A1 | 3/2008 | Shin et al. | |

FOREIGN PATENT DOCUMENTS

| | | |
|---|---|---|
| DE | 101 42 967 A1 | 3/2003 |
| DE | 102 05 642 A1 | 8/2003 |
| EP | 0 320 439 A2 | 6/1989 |
| EP | 0 755 027 A2 | 1/1997 |
| EP | 0 955 219 A2 | 11/1999 |
| EP | 1 319 563 A1 | 6/2003 |
| EP | 1 361 324 A2 | 11/2003 |
| EP | 1 804 210 A1 | 7/2007 |
| GB | 2 240 418 A | 7/1991 |
| JP | 6-012576 A | 1/1994 |
| JP | 7-210716 A | 8/1995 |
| JP | 2002/083372 A | 3/2002 |
| JP | 2005/011107 A | 1/2005 |
| KR | 2003-0021359 A | 3/2003 |
| WO | 99/52066 A1 | 10/1999 |
| WO | 00/11624 A1 | 3/2000 |
| WO | 00/17833 A1 | 3/2000 |
| WO | 2005/027035 A1 | 3/2005 |
| WO | 2006/070278 A1 | 7/2006 |
| WO | 2006/100171 A1 | 9/2006 |
| WO | 2006/138584 A2 | 12/2006 |
| WO | 2008/125177 A2 | 10/2008 |
| WO | 2008/134657 A2 | 11/2008 |

OTHER PUBLICATIONS

Yahoo: "Navigation Tabs" Yahoo Developer Network [Online] Jun. 17, 2006, Retrieved from the Internet: URL: http://developer.yahoo.com/ypatterns/navigation/tabs/navtabs.html[retrieved on Apr. 17, 2006].

* cited by examiner

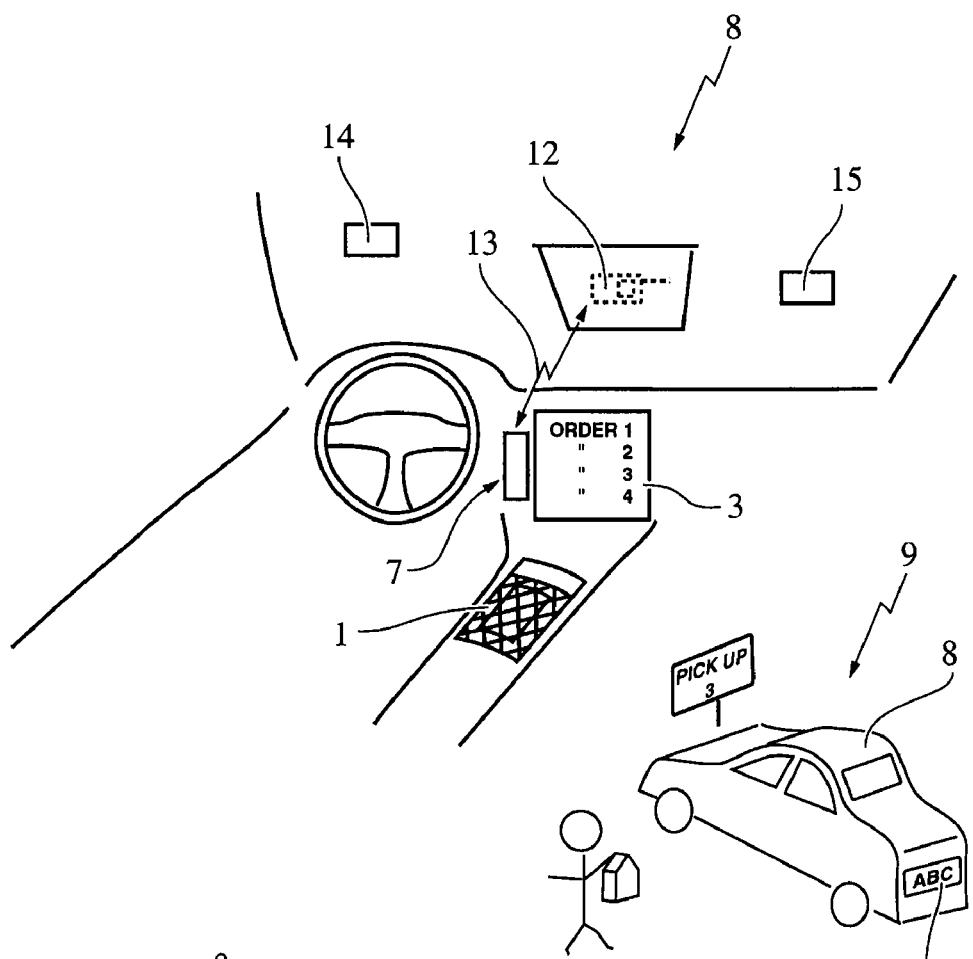
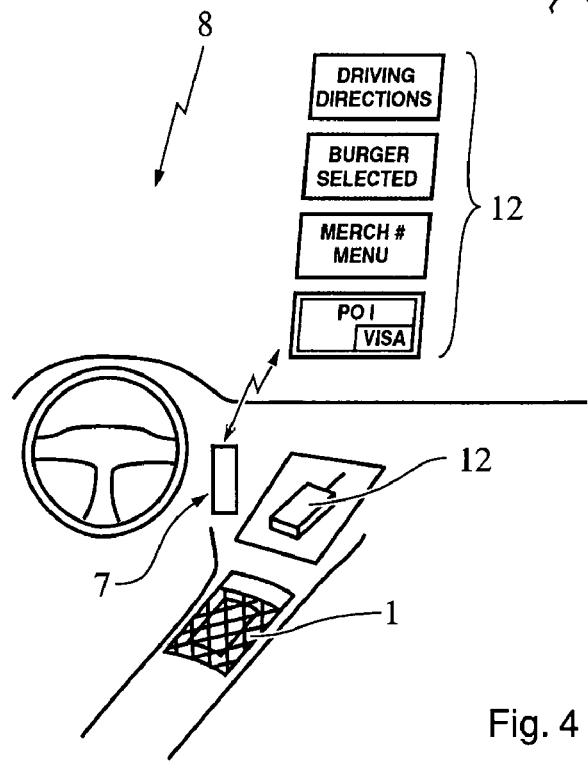

METHOD AND DEVICE FOR COMMUNICATION BETWEEN AN AUTOMOBILE AND A POINT OF SALE

CLAIM OF BENEFIT OF FILING DATE

The present application claims the benefit of the filing date of U.S. Provisional Application Ser. No. 61/054,884 (Filed May 21, 2008), and the entirety of the contents of this application being hereby expressly incorporated by reference.

BACKGROUND OF THE INVENTION

1. Field of the Invention

The present invention generally relates to a method and to a device to realize a financial transaction by means of a mobile device, especially while travelling in a vehicle and, more particularly, to providing such functions through a near field communication (NFC)-infrastructure.

2. Description of the Prior Art

When purchasing items using mobile devices, it is often awkward to communicate personal purchasing instrument information, e.g. credit/debit card information. This is particularly difficult during operating a motor vehicle. When merchants require payment during the ordering transaction, some form of monetary exchange needs to be performed.

Recent advances in semiconductor technology, particularly extremely thin substrates, has also allowed chips to be fabricated with substantial mechanical flexibility and robustness adequate for inclusion of electronic circuits of substantial complexity within conveniently carried cards physically similar to credit cards currently in use. It is generally known, e.g. from U.S. Pat. No. 7,128,274 B4, to provide contactless credit/debit cards with a wireless communication capability. These cards have electronic components built into them that allow the transfer of information to a point of sale terminal when the card is within some centimeters of the terminal.

DESCRIPTION OF THE INVENTION AND OF THE DRAWING

It is an object of the present invention to provide an alternative communication arrangement such that the use of credit/debit cards or the transmittal of other financial information while using a vehicle (as a passenger) or while driving a vehicle (as a driver) is possible, especially without distracting the driver's attention too much from traffic. A further object of the present invention is to provide a method and a device to facilitate the afore mentioned use of a credit/debit cards or the financial information while using a vehicle or while driving a vehicle.

This problem is solved by providing an automobile equipped with a reader to be placed inside of the automobile, wherein the reader is able to read purchasing instrument data of at least one of a contactless credit card or smart card-type credit card or NFC-enabled handset, the reader being further connected to a wireless communication interface of the automobile, the wireless communication interface being able to transmit the purchasing instrument data to a point of sale. The reader in the automobile is able to read the relevant information on for example a contactless-credit-card, a smart-card, especially smart cards having a magnetic stripe and/or a semiconductor chip as a memory to store the purchasing instrument data, possibly by means of using an encryption method or a Near Flied Communication (NFC)-enabled handset, for example a mobile phone, on which the relevant information, especially financial transaction information, is stored. Preferably the reader also determines if such a card or a handset is or was present on the reader or was removed from the reader. The reader transmits the relevant information, for example financial, credit card information, especially securely, to other systems in the vehicle. This information can be used to purchase goods remotely from the vehicle. . It is preferred according to the present invention, that the reader is able to read and/or to interact with a plurality of credit cards / debit cards. Alternatively, it is possible according to the present invention that a plurality of reader is present in the automobile such that one reader is able to read and/or to interact with one credit/debit card.

Furthermore, it is particularly preferred according to all embodiments of the present invention that the user can choose one of the plurality of credit/debit cards in order to conduct a specific purchase transaction. Furthermore, it is preferred according to the present invention that one of the plurality of credit/debit cards or plurality of credit/debit instruments is preselected as being the preferred to use for a specific purchase transaction. If the automobile is equipped with a GPS antenna and/or GPS coordinates or GPS position data (or position data according to another satellite based navigational or combined satellite and land based geolocalization system) are available, it is furthermore preferred according to the present invention that the preselection of one of the plurality of credit/debit cards (as being the preferred to use for a specific purchase transaction) depends on the position of the automobile. This means that, e.g. if the user prefers to pay the parking fees for a one or a plurality car parks only via one of his plurality of credit/debit cards, the one of the plurality of credit/debit cards is preselected if the position of the automobile is known to be close to the one or the plurality car parks and another credit/debit card is preselected if the position of the automobile is known to be close to e.g. a self service or drive-in restaurant.

According to all embodiments of the present invention, it is preferred that the wireless communication interface is a wide area communication interface. Furthermore according to the present invention, it is preferred that the wireless communication interface is one of a GSM-interface (global system for mobile telecommunication) or a UMTS-interface (universal mobile telecommunication system). Alternatively to the wireless communication interface being a wide area communication system interface it is also preferred according to the present invention that the wireless communication interface is a short range communication interface, e.g. one of a NFC-interface (near field communication) or a Bluetooth-interface or a WLAN-interface (wireless local area network) or an interface according the ISO 14443-standard or an interface according to the ISO 15693-standard. The wireless communication interface can also be an integrated interface able to communicate in accordance to a wide area communication standard and a short range communication standard.

According all embodiments of the present invention, it is furthermore preferred that the wireless communication interface is at least partially located in the side view mirror of the automobile and/or in the door panel of the automobile. By means of such a configuration, it is advantageously possible that the wireless communication interface can be moved very close to another wireless communication interface (or the antenna thereof) of a communication partner, e.g. a point of sale.

According all embodiments of the present invention, it is furthermore preferred that the automobile comprises a display device. Preferably, the display device displays a price information which is transmitted by means of the wireless communication interface. Thereby, it is advantageously possible that a very comfortable way of paying goods or services is possible to use for a user inside of the automobile. The display is preferably a so-called center display. Such a display is usually located between a driver's seat and a passenger's seat and can be seen or viewed both by the driver and by the passenger (and possible also by a passenger seated behind the driver/passenger).

It is another object of the present invention to provide a reader to be placed inside of an automobile, wherein the reader is able to read purchasing instrument data of at least one of a contactless credit card or a smart card-type credit card or a NFC-enabled handset, the reader being further connected to a wireless communication interface of the automobile, the wireless communication interface being able to transmit the purchasing instrument data to a point of sale. It is preferred according to the present invention, that the reader is able to read and/or to interact with a plurality of credit cards/debit cards. Furthermore, it is preferred that the user can choose one of the plurality of credit/debit cards in order to conduct a specific purchase transaction. Alternatively, it is possible according to the present invention that a plurality of reader is present in the automobile such that one reader is able to read and/or to interact with one credit/debit card.

It is another object of the present invention to provide a method to facilitate the use of purchasing instrument data inside of an automobile, wherein in a first step the purchasing instrument data of at least one of a contactless credit card or a smart card-type credit card or a NFC-enabled handset are read by a reader and wherein in a second step the purchasing instrument data are transmitted to a point of sale via a wireless communication interface of the automobile. It is preferred according to the present invention, that the reader is able to read and/or to interact with a plurality of credit cards/debit cards. Furthermore, it is preferred that the user can choose one of the plurality of credit/debit cards in order to conduct a specific purchase transaction.

According to the present invention, it is preferred that on a display of the automobile, especially the center display of the automobile, information is displayed that is related to a purchasing operation. Such information can include according to the present invention one or a plurality of the following information or part thereof:
buying options,
payment amount/pricing information,
POI-related (point-of-interest-related) menu options,
driving direction, e.g. to a POI (point-of-interest),
ETA (estimated time of arrival) related information, e.g. to define order availability,
parking options like a menu of choices and/or of prices, directions to parking site, time availability,
coupons available dependent on the location of the automobile, especially relative to a point of sale.

According all embodiments of the present invention, it is preferred that in addition to the transmission of the purchasing instrument data, at least one of a vehicle identification number or a license-plate-number is transmitted. Thereby it is advantageously possible to control the delivery of goods to the occupant of the automobile.

Furthermore according to all embodiments of the present invention, it is preferred that prior to transmitting the purchasing instrument data to the point of sale, the payment needs to be initiated by an occupant of the automobile. Thereby, it is advantageously possible to enhance the security level of the financial transaction associated with the purchase operation.

According all embodiments of the present invention, it is furthermore also preferred that the transmission of the purchasing instrument data a navigation process of the automobile to the point of sale is initiated. Thereby, it is advantageously possible to further render to use of mobile commerce transaction more comfortable to a user inside of an automobile.

Figure 2:
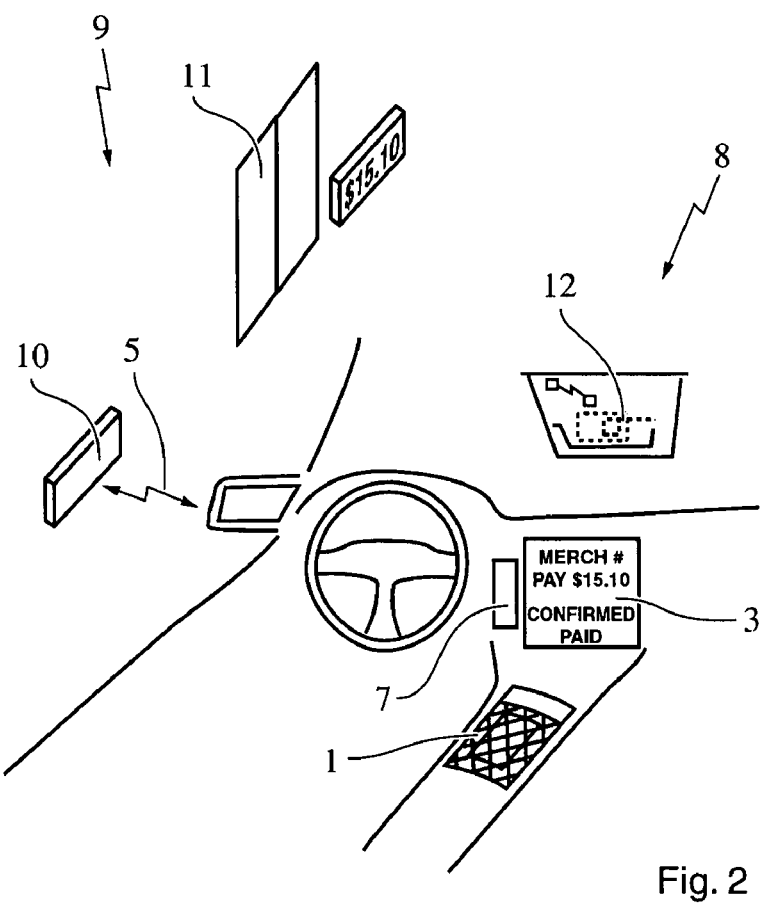

The invention is now explained according to the figures.
FIG. 1 shows a first embodiment of the present invention.
FIG. 2 shows a second embodiment of the present invention.
FIG. 3 shows a third embodiment of the present invention.
FIG. 4 shows a fourth embodiment of the present invention.
FIG. 1 shows a first embodiment of the present invention. The vehicle 8 comprises a reader 1 on or in the vicinity of which a wallet 2 is placed.

The wallet 2 comprises at least one contactless credit card. Via NFC, the relevant financial information is, preferably securely, transferred from the credit card to a system (not depicted) in the automobile comprising a reader 1. This system is connected to or comprises a display 3, for example the display conventionally used for the navigation system, on which the respective credit card and/or information from the credit card is displayed. The system comprises preferably means to select a certain credit card for payment. The credit card information is then transferred from the vehicle 8 to the receiver 4 of a merchant 9 or a bank, so that the amount to be paid is debited from the credit card and/or relevant account. The amount to be paid is preferably displayed on a display 6 owned by the merchant which can be seen by the car occupant. Preferably, the transfer of the payment is only executed after the car occupant has initiated the payment. Reference number 5 indicates the interface between the vehicle and the merchant or the bank.

The transmittal 5 of the information can be done via a wireless infrastructure, e.g. via a wireless communications link according to a mobile telecommunications standard like GSM (Global system for mobile telecommunication), UMTS (Universal mobile telecommunication system), WLAN (wireless local area network) or the like, with a purchase transaction system or payment transaction system. The purchase transaction system or payment transaction system is preferably a system having an internet based access (e.g. IP (internet protocol) based system or network).

FIG. 2 shows another embodiment of the present invention. In this case, the relevant financial information is stored on a mobile phone 12 which is preferably NFC-enabled and/or connected to the electronic system of the car 8 via a connection system 7, for example Bluetooth. A merchant tag 10 which is in wireless communication 5 with the car transmits a price to be paid, which is for example displayed on a display 3 of a car. After a vehicle occupant has approved the payment, it is initiated by for example calling a paymaster. A system automatically sends the relevant financial information to the paymaster and receives a signal that the payment has been accepted or denied. This information is also displayed on the display 3. The entire exchange of information is preferably done via the mobile phone 12. After the payment has been finalized, the vehicle is driven for example to a pick up window. In the vicinity of the pick up window 11, the amount paid is preferably displayed again.

FIG. 3 shows yet another embodiment of the present invention. Via a wireless interface, for example a mobile phone 12, potential orders are received and preferably displayed on a display 3. The wireless interface also allows oral communication to a merchant 9 and/or a payment-system. Via for example a microphone 14, a vehicle occupant communicates the selected order to a merchant 9 and the merchant 9 confirms the order, which can be heard via speakers 15, located in the vehicle 8. The vehicle occupant then initiates the payment and transmits, preferably automatically, a vehicle identification number (VIN) and/or a license-plate-number (LIC#) 16 to the merchant 9. The mobile phone 12 NFC-enabled and/or connected to the electronic system of the car 8 via a connection system 13, for example Bluetooth 13 contains the financial information needed for a financial transaction and transmits it to the merchant 9. After the payment has been accepted, the merchant 9 communicates via speakers 15 at which pick-up-place the goods can be picked up. Since the merchant 9 knows the VIC and/or LIC#, it can be excluded that the goods are delivered to a wrong car.

A fourth embodiment of the present invention is depicted in FIG. 4. Communication to a point of interest (POI) is initiated via a wireless communication, e.g. a mobile phone 12, and a menu is requested from a merchant 9. The transmitted menu is depicted on a display 3 of the vehicle or on a display of the mobile phone 12. The vehicle occupant selects, e.g., a burger and transmits the selection. After the merchant 9 has confirmed the selection or right after the selection, payment is automatically initiated. The relevant payment information is stored on the mobile phone 12 which is NFC-enabled and/or connected to the electronic system of the car 8 via a connection system 7, for example Bluetooth and transferred to the merchant 9 and/or a payment-system. After the payment has been finalized, driving directions are transferred automatically to the vehicle 8, preferably the navigation system, which guides the vehicle 8 to the merchant 9.

List of Reference Signs
1 reader
2 wallet
3 display, display from navigation system
4 receiver
5 transmittal
6 display
7 connection between mobile phone and electronic of the car
8 automobile
9 merchant
10 merchant tag
11 pick up window
12 mobile phone
13 bluetooth
14 microphone
15 speaker
16 license plate number

What is claimed is:

1. Reader to be placed inside of an automobile, wherein the reader determines if a mobile phone is or was present on the reader or was removed from the reader and is able to read purchasing instrument data on the mobile phone, on which the purchasing instrument data are stored, the reader being further connected wireless communication interface of the automobile, the wireless communication interface being able to transmit information related to a purchasing operation and the purchasing instrument data to a point of sale, wherein the automobile comprises a display device, wherein from the point of sale, information related to the purchasing operation and to the purchasing instrument data is transmitted, by means of wireless communication interface, wherein the information related to the purchasing operation and to the purchasing instrument data is displayed on the display device and wherein the transmission of the purchasing instrument data initiates a navigation process of the automobile to the point of sale.

2. An automobile comprising the reader according to claim 1 to be placed inside of the automobile, wherein the reader determines if a mobile phone is or was on the reader or was removed from the reader and is able to read purchasing instrument data on the mobile phone, on which the purchasing instrument data are stored, the reader being further connected to a wireless communication interface of the automobile, the wireless communication interface being able to transmit the purchasing instrument data to a point of sale, wherein the automobile comprises a display device, wherein from the point of sale information related to a purchasing operation is transmitted by means of the wireless communication interface and wherein the transmission of the purchasing instrument data initiates a navigation process of the automobile to the point of sale.

3. Automobile according to claim 2, wherein the wireless communication interface is a wide area communication interface.

4. Automobile according to claim 3, wherein the wireless communication interface is one of a GSM-interface (global system for mobile telecommunication) or a UMTS-interface (universal mobile telecommunication system).

5. Automobile according to claim 2, wherein the wireless communication interface is a short range communication interface.

6. Automobile according to claim 5, wherein the wireless communication interface is one of a NFC-interface (near field communication) or a Bluetooth-interface or a WLAN-interface (wireless local area network) or an interface according the ISO 14443-standard or an interface according to the ISO 15693-standard.

7. Automobile according to claim 2, wherein the wireless communication interface is located in the side view mirror of the automobile.

8. Automobile according to claim 2, wherein the wireless communication interface is located in the door panel of the automobile.

9. Automobile according to claim 2, wherein the automobile comprises a display device and wherein a price information is transmitted by means of the wireless communication interface.

10. Automobile according a to claim 2, wherein prior to the purchasing process a menu is requested from a merchant and displayed employing the display device and the transmission process is used to transmit a user choice to the merchant.

11. Method comprising,
using a reader according to claim 1, to determine if a mobile phone is or was present on the reader or was removed from the reader and is able to read the purchasing instrument data stored on the mobile phone and;
transmitting in a second step the purchasing instrument data to a point of sale via a wireless communication interface t the automobile 12. Method according to claim 11, wherein in addition to transmitting the purchasing instrument data, at least one of a vehicle identification number or a license-plate-number is transmitted.

13. Method according to claim 11, wherein prior to transmitting the purchasing instrument data to the point of sale, the payment needs to be initiated by an occupant of the automobile.

14. Method comprising:
a) requesting information about a potential purchase from a point of sale via a wireless interface located in a vehicle;
b) receiving through the reader according to claim 1 information about the purchase via the wireless interface wherein the information is displayed by the display the vehicle;
c) ordering the goods wherein the order is transmitted by the reader via the wireless interface to the point of sale;

d) receiving through the reader via the wireless interface from the point of sale a price to be paid which is displayed on the display;
e) reading the purchase instrument data stored in the mobile phone using the reader which transmits the purchasing instrument data via the wireless interface to the point of sale; and
f) receiving through the reader via wireless interface acceptance or denial of payment and displaying this information on the display or, receiving from the point of sale through speakers located in the vehicle which place to pick up the goods.

15. Method according to claim 14 which comprises:
f) receiving through the reader via wireless interface acceptance or denial of payment and displaying this information on the display.

16. Method according to claim 14 which comprises:
f) receiving from the point of sale through speakers located in the vehicle which place to pick up the goods.

17. Method according to claim 14 which further comprises:
g) transferring automatically to the vehicle navigation system driving directions to the place to pick up the goods.

18. Automobile equipped with a reader to be placed inside of the automobile, wherein the reader determines if a mobile phone is or was present on the reader or was removed from the reader and is able to read purchasing instrument data on the mobile phone, on which the purchasing instrument data are stored, the reader being further connected to a wireless communication interface of the automobile, wherein the wireless communication interface is a Bluetooth interface, the wireless communication interface being able to transmit the purchasing instrument data to a point of sale, wherein the automobile comprises a display device, wherein from the point of sale an information related to a purchasing operation is transmitted by means of the wireless communication interface, wherein the information related to the purchasing operation is displayed on the display device, wherein the automobile is equipped with a GPS antenna and wherein a preselected of one of the plurality of purchasing instrument data depends on the position of the automobile and wherein the transmission of the purchasing instrument data initiates a navigation process of the automobile to the point of sale.

19. Reader to be placed inside of an automobile, wherein the reader determines if a mobile phone is or was present on the reader or was removed from the reader and is able to read purchasing instrument data on the mobile phone, on which the purchasing instrument data are stored, the reader being further connected to a wireless communication interface of the automobile, wherein the wireless communication interface is a Bluetooth interface, the wireless communication interface being able to transmit the purchasing instrument data to a point of sale,
wherein the automobile comprises a display device,
wherein from the point of sale an information related to a purchasing operation is transmitted by means of the wireless communication interface and wherein the information related to a the purchasing operation is displayed on the display device, wherein the automobile is equipped with a GPS antenna wherein a preselected of one of the plurality of purchasing instrument data depends on the position of the automobile and wherein the transmission of the purchasing instrument data initiates a navigation process of the automobile to the point of sale.

20. Reader according to claim 19 wherein the reader is able to read purchasing instrument data on a NFC-enabled handset using near field communication (NFC).

* * * * *

UNITED STATES PATENT AND TRADEMARK OFFICE
CERTIFICATE OF CORRECTION

PATENT NO. : 8,348,154 B2
APPLICATION NO. : 12/469878
DATED : January 8, 2013
INVENTOR(S) : Michael J. Sims et al.

Page 1 of 1

It is certified that error appears in the above-identified patent and that said Letters Patent is hereby corrected as shown below:

Column 6, Line 49, Claim 11, please delete "t" and replace with "of"

Signed and Sealed this
Nineteenth Day of February, 2013

Teresa Stanek Rea
*Acting Director of the United States Patent and Trademark Office*